(12) United States Patent
Chen et al.

(10) Patent No.: US 11,435,843 B2
(45) Date of Patent: Sep. 6, 2022

(54) DISPLAY PANEL AND METHOD OF FABRICATING THE SAME

(71) Applicant: HannStar Display Corporation, Taipei (TW)

(72) Inventors: Jing-Xuan Chen, Tainan (TW); Cheng-Yen Yeh, Taichung (TW); Mu-Kai Kang, Tainan (TW); Sz-Kai Huang, Taichung (TW)

(73) Assignee: HannStar Display Corporation, Taipei (TW)

( * ) Notice: Subject to any disclaimer, the term of this patent is extended or adjusted under 35 U.S.C. 154(b) by 0 days.

(21) Appl. No.: 17/446,830

(22) Filed: Sep. 2, 2021

(65) Prior Publication Data
US 2022/0129097 A1 Apr. 28, 2022

(30) Foreign Application Priority Data
Oct. 28, 2020 (CN) .......................... 202011169757.5

(51) Int. Cl.
| | |
|---|---|
| *G09G 3/36* | (2006.01) |
| *G06F 3/041* | (2006.01) |
| *G02F 1/1362* | (2006.01) |
| *G02F 1/1333* | (2006.01) |
| *G02F 1/1343* | (2006.01) |
| *G02F 1/1368* | (2006.01) |

(52) U.S. Cl.
CPC .......... *G06F 3/0412* (2013.01); *G02F 1/1368* (2013.01); *G02F 1/13338* (2013.01); *G02F 1/13439* (2013.01); *G02F 1/134318* (2021.01); *G02F 1/134327* (2013.01); *G02F 1/136295* (2021.01); *G06F 3/04184* (2019.05); *G06F 2203/04103* (2013.01)

(58) Field of Classification Search
CPC ............... G06F 3/0412; G06F 1/13338; G06F 2203/04103; G02F 1/134327; G02F 1/13439; G02F 1/136295
See application file for complete search history.

(56) References Cited

U.S. PATENT DOCUMENTS

| | | | | |
|---|---|---|---|---|
| 2004/0233343 | A1* | 11/2004 | Baek ................. | G02F 1/134336 349/38 |
| 2005/0068281 | A1* | 3/2005 | Shin .................. | G02F 1/134336 345/88 |
| 2019/0056609 | A1* | 2/2019 | Kim .................. | G02F 1/134336 |

* cited by examiner

*Primary Examiner* — Sanghyuk Park
(74) *Attorney, Agent, or Firm* — CKC & Partners Co., LLC

(57) ABSTRACT

A display panel and a fabrication method thereof are provided. The display panel includes pixels, data lines and scan lines. The pixels are arranged in pixel rows and pixel columns, and each pixel has subpixels. The data lines are configured to transmit data signals to the pixels, and each data line has a non-straight and continuously curved shape or a non-straight and continuously bent shape. The scan lines are configured to sequentially transmit scan signals to the pixels. The subpixels of each pixel are coupled to different scan lines, and each data line is curved or bent with respect to a unit of one pixel. Accordingly, the display panel of the invention can avoid the problems of poor image display and vertical line (V-line) defects as well as reducing power consumption.

16 Claims, 11 Drawing Sheets

DISPLAY PANEL AND METHOD OF FABRICATING THE SAME

RELATED APPLICATIONS

This application claims priority to Chinese Application Serial Number 202011169757.5 filed Oct. 28, 2020, which is herein incorporated by reference.

BACKGROUND

Field of Invention

The present invention relates to a display, and in particular to a display panel with a particular pixel structure arrangement and a method of fabricating the display panel.

Description of Related Art

With the evolution of display technology and panel manufacturing technology, flat display panels have now been applied to various types of electronic products. Every electronic product such as a smartphone, a tablet computer, etc., has a flat display panel. In order to further reduce power consumption of the flat display panel, related industries have proposed various solutions to meet the needs of energy saving and carbon reduction. One of the solutions is to arrange the pixel structure of the display panel as a dual-gate pixel structure. In the dual-gate pixel structure, the same data line is coupled to two adjacent columns of subpixels, and the subpixels in the same pixel row are respectively coupled to two adjacent gate lines, such that the number of data lines can be reduced by half, thereby reducing the power consumption as well as achieving narrow bezel and reducing production cost.

However, in a conventional dual-gate pixel structure, the layout sizes of the pixels are inconsistent, which would result in inconsistent gate-source capacitances (Cgs) of the pixel transistors, thus causing poor display quality and vertical line (V-line) defects.

SUMMARY

An objective of the invention is to provide a display panel which has a specific pixel structure arrangement for solving the abovementioned display problems as well as reducing power consumption. Another objective of the invention is to provide a method of fabricating the display panel.

According to the above objectives, the invention provides a display panel which includes pixels, data lines and scan lines. The pixels are arranged in pixel rows and pixel columns, and each pixel includes subpixels. The data lines are configured to transmit data signals to the pixels, and each data line has a non-straight and continuously curved shape, or a non-straight and continuously bent shape. The scan lines are configured to sequentially transmit scan signals to the pixels. The subpixels of each pixel are coupled to different scan lines, and each data line is curved or bent with respect to a unit of one pixel.

In one embodiment of the invention, the second to the penultimate of the data lines respectively have first segments and second segments, and the first segments and the second segments of the same data line are respectively coupled to two adjacent pixel columns.

In one further embodiment of the invention, the display panel further includes touch sensing lines that are configured to provide touch sensing signals, in which each touch sensing line has a non-straight and continuously curved shape or a non-straight and continuously bent shape, and each touch sensing line is curved or bent with respect to a unit of one pixel.

In one further embodiment of the invention, the data lines and the touch sensing lines are formed from the same metal layer.

In one further embodiment of the invention, a distance between two adjacent data line and touch sensing line in the data lines and the touch sensing lines is 3 microns to 5 microns.

In one further embodiment of the invention, the display panel further includes a pixel electrode layer and a common electrode layer, in which the pixel electrode layer has pixel electrodes that are respectively in the subpixels of the pixels, and the common electrode layer has common electrodes that are respectively coupled to the touch sensing lines.

In one further embodiment of the invention, each common electrode has an opening directly over at least one of the touch sensing lines.

In one further embodiment of the invention, the common electrode layer is over the pixel electrode layer, and each common electrode is coupled to at least one of the touch sensing lines via at least one first through hole.

In one further embodiment of the invention, the pixel electrode layer is over the common electrode layer and further includes bridge electrodes, and each common electrode is coupled to at least one of the touch sensing lines via at least one of the bridge electrodes.

In one further embodiment of the invention, each pixel electrode is coupled to a pixel transistor of one of the subpixels via a second through hole.

In one further embodiment of the invention, each common electrode has an opening directly over at least one of the scan lines.

According to the above objectives, the invention further provides a method of fabricating a display panel, in which the method includes forming a first metal layer over a substrate and forming a second metal layer over the first metal layer. The first metal layer includes scan lines. The second metal layer includes data lines and touch sensing lines, and each of the data lines and touch sensing lines has a non-straight and continuously curved shape or a non-straight and continuously bent shape. The scan lines and the data lines cooperatively define the subpixels, and the subpixels are respectively coupled to the scan lines, and the data lines and the touch sensing lines are curved or bent with respect to a unit of three subpixels.

In one embodiment of the invention, the method further includes forming a pixel electrode layer over the second metal layer and forming a common electrode layer over the pixel electrode layer. The pixel electrode layer includes pixel electrodes that are respectively in the subpixels. The common electrode layer includes common electrodes that are respectively coupled to the touch sensing lines.

In one further embodiment of the invention, the method further includes forming a common electrode layer over the second metal layer and forming a pixel electrode layer over the common electrode layer. The common electrode layer includes common electrodes that are respectively coupled to the touch sensing lines. The pixel electrode layer includes pixel electrodes that are respectively in the subpixels.

In one further embodiment of the invention, the method further includes patterning the common electrode layer to form an opening of the common electrodes directly over the touch sensing lines.

The present invention has at least the advantages of avoiding the problems of poor display quality and vertical line (V-line) defects as well as reducing power consumption.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
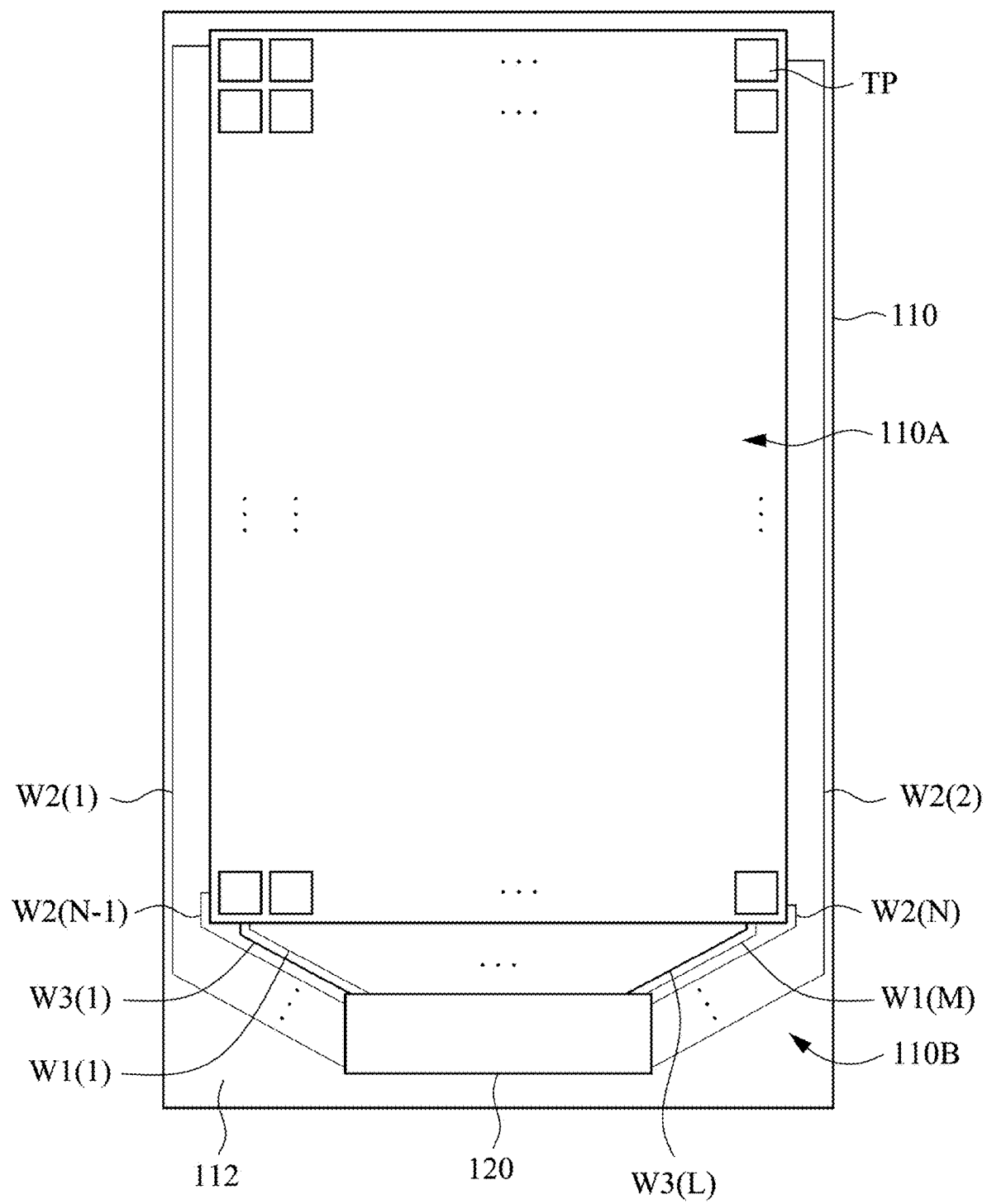
FIG. 1 is a schematic diagram of a display apparatus in accordance with some embodiments of the invention.

Specific embodiments of the present invention are further described in detail below with reference to the accompanying drawings, however, the embodiments described are not intended to limit the present invention and it is not intended for the description of operation to limit the order of implementation.

It will be understood that, although the terms "first" and "second" may be used herein to describe various elements, components, areas and/or portions, these elements, components, areas and/or portions, should not be limited by these terms. These terms are only used to distinguish elements, components, areas and/or portions.

Terms used herein are only used to describe the specific embodiments, which are not used to limit the claims appended herewith. Unless limited otherwise, the term "a," "an," "one" or "the" of the single form may also represent the plural form. In addition, the spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Reference numerals and/or letters may be repeated in the various examples. This repetition is for the purpose of simplicity and clarity and does not in itself dictate a relationship between the various embodiments and/or configurations discussed. In addition, to simplify the accompanying drawings, some conventional structures and elements are shown in a simple schematic manner or are not shown in the accompanying drawings, and the actual size and proportion of each component in this context are not limited to the content shown in the accompanying drawings.

Referring to FIG. 1, FIG. 1 is a schematic diagram of a display apparatus 100 in accordance with some embodiments of the invention. The display apparatus 100 includes a display panel 110 and a driving circuit 120. The display panel 110 may be, for example, a liquid crystal display panel of twisted nematic (TN) mode, in-plane switching (IPS) mode, fringe-field switching (FFS) mode or vertical alignment (VA) mode, but the invention is not limited thereto. In addition, the display panel 110 has an active area 110A and a peripheral area 110B, and includes pixels (not shown in FIG. 1), touch sensing pads TP, first wires W1(1)-W1(M), second wires W2(1)-W2(N) and third wires W3(1)-W3(L) disposed on the substrate 112, in which the pixels and the touch sensing pads TP are in the active area 110A, and the first wires W1(1)-W1(M), the second wires W2(1)-W2(N) and the third wires W3(1)-W3(L) are in the peripheral area 110B. The first wires W1(1)-W1(M) and the second wires W2(1)-W2(N) respectively transmit data signals and scan signals to the pixels in the active area 110A, such that the pixels display corresponding gray levels at a specific time, while the third wires W3(1)-W3(L) respectively transmit touch sensing signals to the touch sensing pads TP in the active area 110A, such that the touch sensing pads TP perform touch sensing at a specific time.

Figure 2:
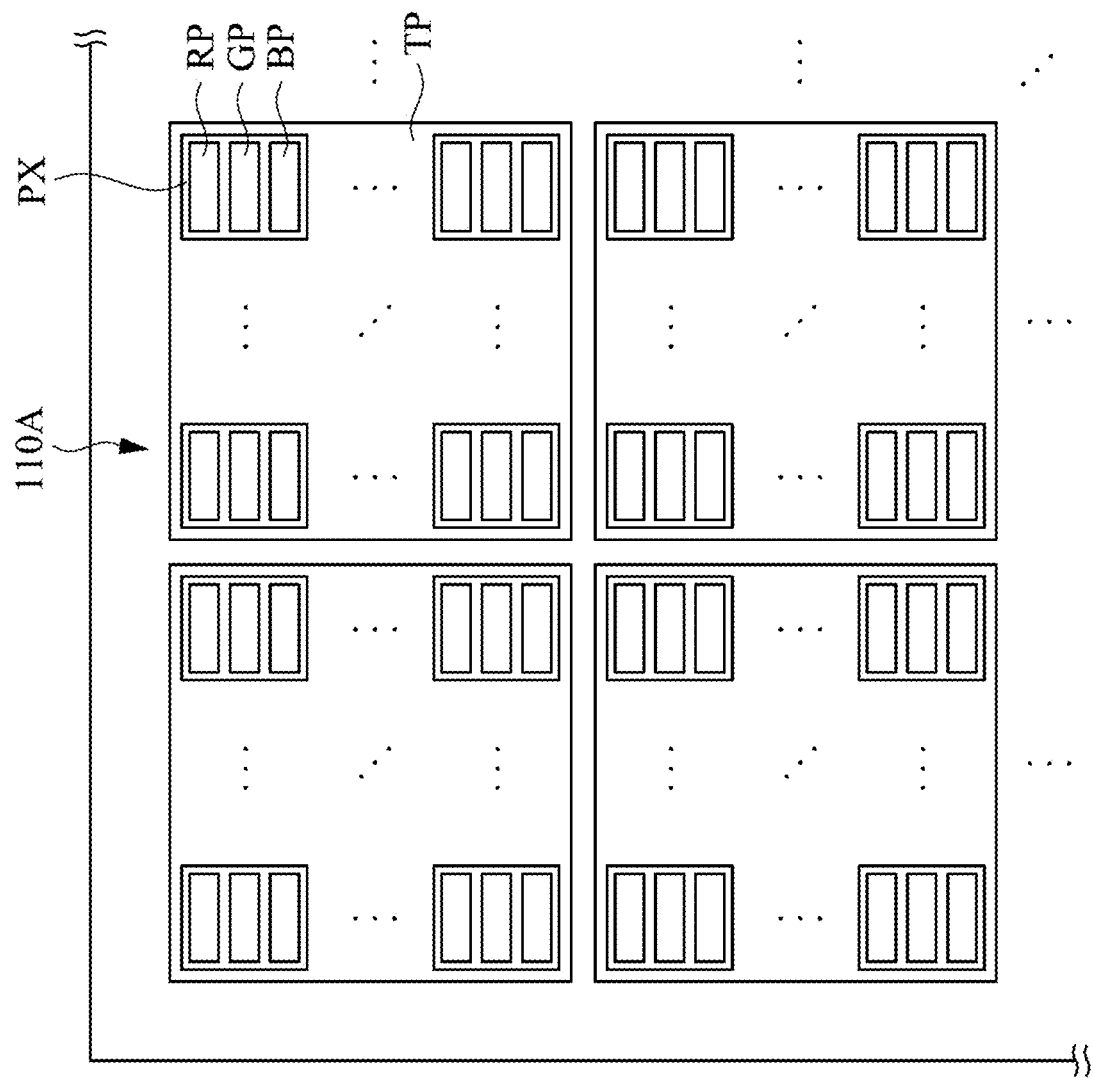
FIG. 2 is a schematic arrangement diagram of pixels and touch sensing pads in an active area of a display panel shown in FIG. 1.

FIG. 2 is a schematic arrangement diagram of pixels PX and the touch sensing pads TP in the active area 110A of the display panel 110 in FIG. 1. As shown in FIG. 2, each of the touch sensing pads TP corresponds to the pixels PX arranged in an array, and each pixel PX includes subpixels RP, GP, BP which may be a red subpixel, a green subpixel and a blue subpixel, respectively. In another embodiment, each pixel PX may include another number of subpixels, and the subpixels RP, GP, BP may correspond to other colors, but the invention is not limited thereto. The number of the pixels PX corresponding to each touch sensing pad TP may be determined according to requirements. In addition, FIG. 2 only illustrates four touch sensing pads TP at the upper left corner of the active area 110A, and as will be comprehended by the persons skilled in the art, and the other parts of the active area 110A also have similar arrangement relationships between the pixels PX and the touch sensing pads TP.

The display panel 110 may be an in-cell touch display panel. That is, the common electrodes in the display panel 110 are also used as the touch sensing pads TP of the display panel 110. The gate driving signals, the data driving signals and the touch sensing signals may be provided by the driving circuit 120, or may be provided respectively by the driving circuit 120 and another driving circuit (e.g. a data driving circuit, a scan driving circuit and/or a touch driving circuit). The driving circuit 120 may be a touch and display driving integration circuit (TDDI circuit). As shown in FIG. 1, the driving circuit 120 provides data signals, scan signals and touch sensing signals to the data lines, the scan lines and the touch sensing lines (not shown in FIG. 1) in the active area 110A respectively through the first wires W1(1)-W1(M), the second wires W2(1)-W2(N) and the third wires W3(1)-W3(L).

The display panel 110 may be a system on glass (SOG) panel. That is, the driving circuit 120 may be made on the substrate 112 of the display panel 110. Therefore, the electrical components in the driving circuit 120 and in the active area 110A (such as but not limited to pixel transistors, pixel electrodes, touch sensing pads TP) may be made by the same process. As shown in FIG. 1, the driving circuit 120 is made on the substrate 112; and in the embodiments where the driving circuit 120 is a touch and display driving integrated circuit, the driving circuit 120 is electrically connected to all data lines in the active area 110A respectively through the first wires W1(1)-W1(M), and is electrically connected to all scan lines in the active area 110A respectively through the second wires W2(1)-W2(N), and is electrically connected to all touch sensing pads TP respectively through the third wires W3(1)-W3(L) in the active area 110A. It is noted that although FIG. 1 illustrates that the driving circuit 120 is disposed at the lower side of the active area 110A, the invention is not limited thereto. In another embodiment, the driving circuit 120 may be disposed at the left, right or upper side of the active area 110A, or may be disposed at two or more sides of the active area 110A. In some embodiments, as will be described in the following paragraphs, the number of data lines is the same as that of touch sensing lines. In other words, the number of first wires W1(1)-W1(M) is the same as the number of third wires W3(1)-W3(L), i.e. L=M.

In other embodiments, the driving circuit 120 may be in one or more chips, and these chips may be bonded to pads (not shown in FIG. 1) disposed on the substrate by a chip on glass (COG), tape automated bonding (TAB) or chip on film (COF) technique, so as to provide data signals, scan signals and touch sensing signals to the electrical components in the active area 110A of the display panel 110.

Figure 3A:
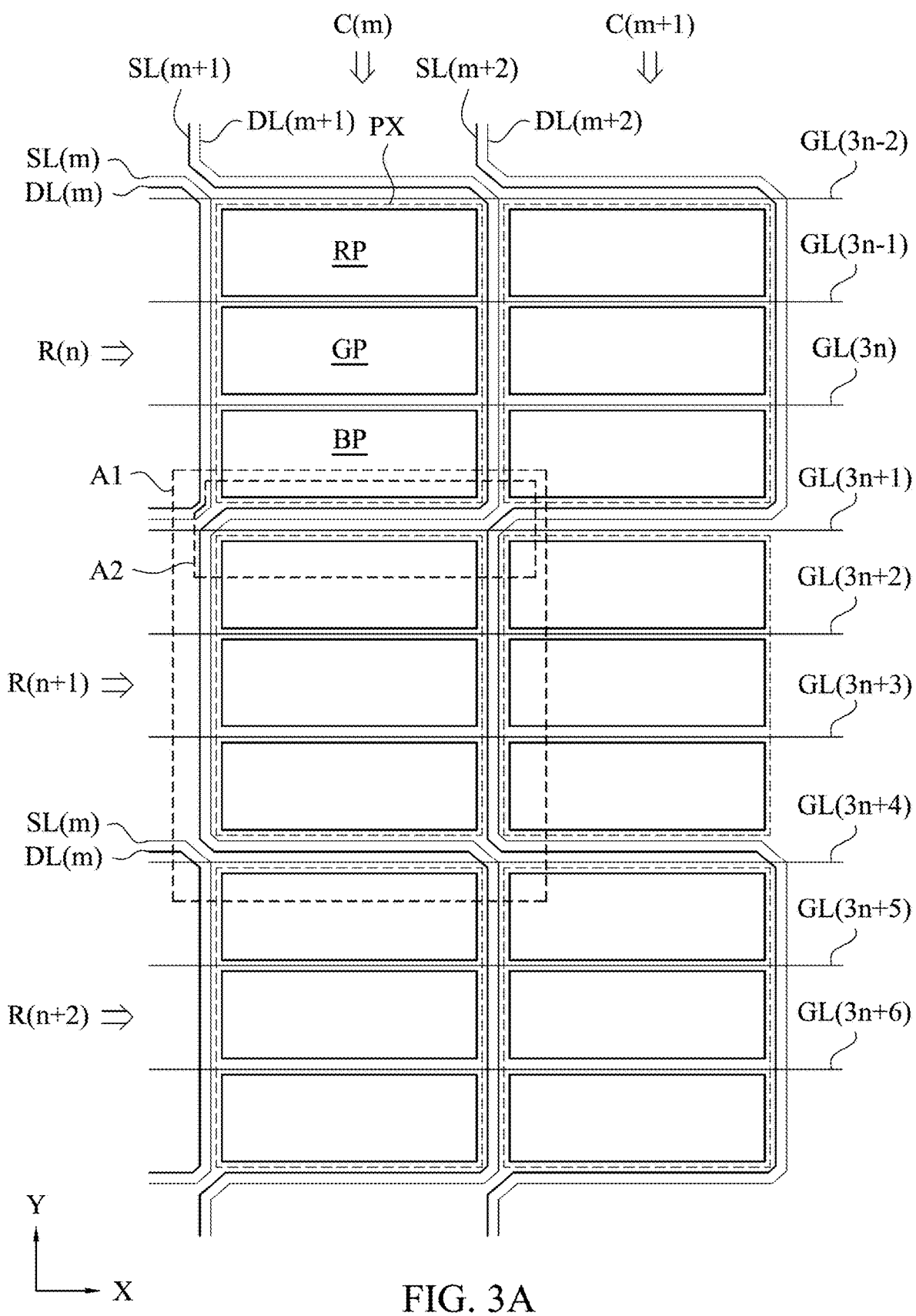
FIG. 3A is a schematic partial diagram of a pixel structure in the active area of the display panel shown in FIG. 1 in accordance with one example.

FIG. 3A is a schematic partial diagram of the pixel structure in the active area 110A of the display panel 110 in FIG. 1 in accordance with one example. The schematic partial diagram shown in FIG. 3A includes the pixels PX in the $n^{th}$ to $(n+2)^{th}$ rows R(n)-R(n+2) and in the $m^{th}$ to $(m+1)^{th}$ pixel columns C(m)-C(m+1) and their neighboring signal lines. In FIG. 3A, the data line DL(m) is coupled to the pixels PX in the $m^{th}$ pixel column C(m) and the $n^{th}$ pixel row R(n), and in the $m^{th}$ pixel column C(m) and the $(n+2)^{th}$ pixel row R(n+2); and the data line DL(m+1) is coupled to the pixels PX in the $(m+1)^{th}$ pixel column C(m+1) and the $n^{th}$ pixel row R(n), in the $m^{th}$ pixel column C(m) and the $(n+1)^{th}$ pixel row R(n+1), and in the $(m+1)^{th}$ pixel column C(m+1) and the $(n+2)^{th}$ pixel row R(n+2), while the data line DL(m+2) is coupled to the pixel PX in the $(m+1)^{th}$ pixel column C(m+1) and the $(n+1)^{th}$ pixel row R(n+1). Each pixel PX in the $n^{th}$ pixel row R(n) is coupled to the scan lines GL(3n−2)-GL(3n), in which the subpixels RP, GP, BP are respectively coupled to the scan lines GL(3n−2), GL(3n−1), GL(3n), and each pixel PX in the $(n+1)^{th}$ pixel row R(n+1) and in the $(n+2)^{th}$ pixel row R(n+2) and the scan lines GL(3n+1)-GL(3n+6) also have similar correspondence. The data lines DL(m)-DL(m+2) and the scan lines GL(3n−2)-GL(3n+6) are configured to respectively provide data signals and scan signals to the corresponding pixels PX. Particularly, the pixel structure shown in FIG. 3A is a tri-gate pixel structure, in which the subpixels RP, GP, BP of the same pixel PX are all coupled to the same data line. For example, the subpixels RP, GP, BP of the pixel PX corresponding to the $n^{th}$ pixel row R(n) and the $m^{th}$ pixel column C(m) are all coupled to the data line DL(m). In addition, as shown in FIG. 3A, the data lines DL(m)-DL(m+2) and the touch sensing lines SL(m)-SL(m+2) are all curved or bent with respect to a unit of one pixel PX.

The touch sensing lines SL(m)-SL(m+2) are respectively adjacent and parallel to the data lines DL(m)-DL(m+2). Each of the touch sensing lines SL(m)-SL(m+2) and the data lines DL(m)-DL(m+2) has a non-straight continuous curved shape or a non-straight continuous bent shape. For example, each of the touch sensing lines SL(m)-SL(m+2) and the data lines DL(m)-DL(m+2) may be formed of zigzag wires connected in series. For example, a distance between the touch sensing line SL(m+1) and the adjacent data line DL(m+1) may be about 3 microns to 5 microns.

Figure 3B:
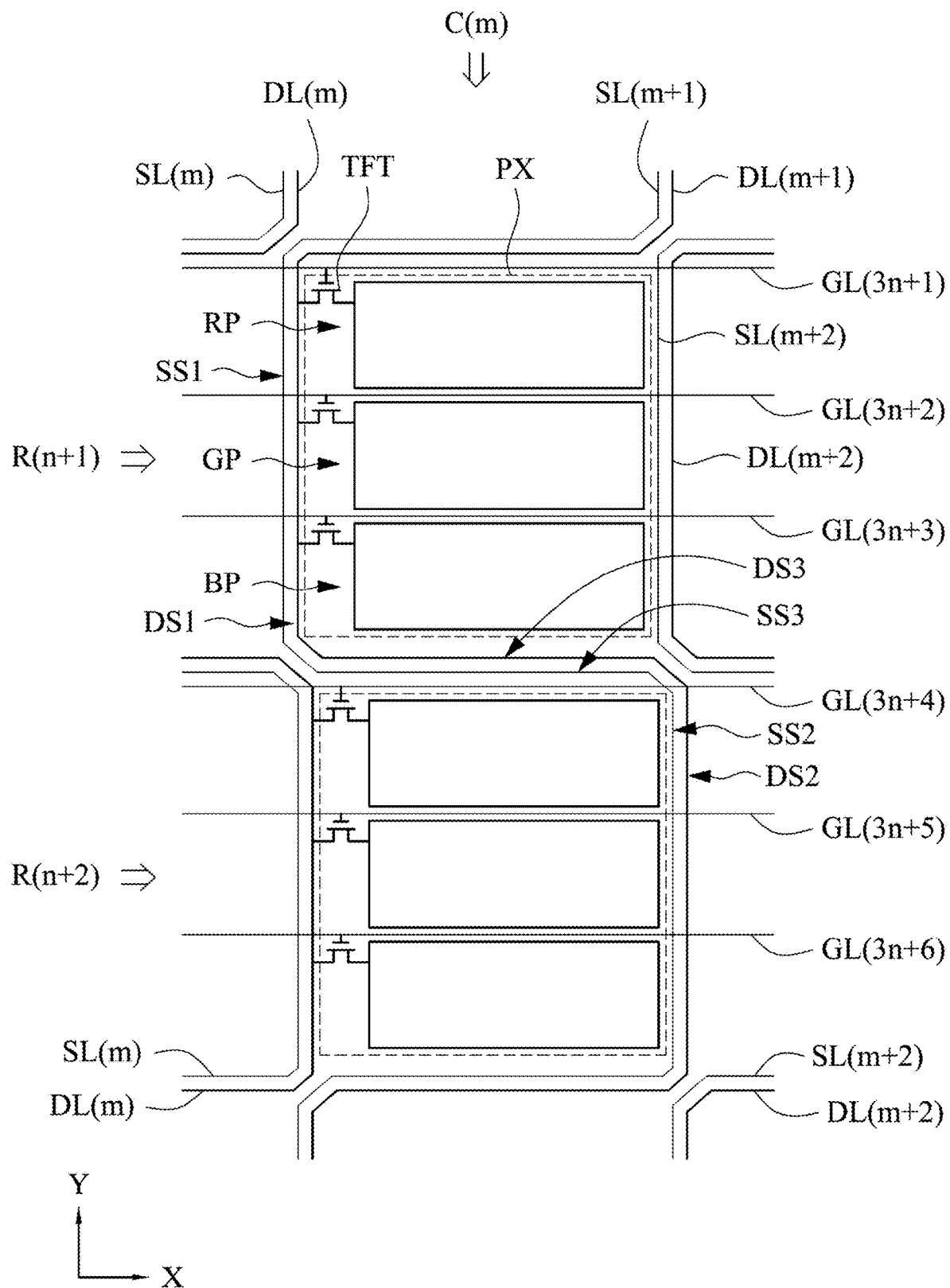
FIG. 3B is a schematic arrangement diagram of an area of the pixel structure shown in FIG. 3A.

FIG. 3B is a schematic arrangement diagram of an area A1 of the pixel structure shown in FIG. 3A. As shown in FIG. 3B, the touch sensing line SL(m+1) has a first segment SS1, a second segment SS2 and a third segment SS3, in which the first segment SS1 is at the left side of the $m^{th}$ pixel column C(m) and is approximately parallel to the Y axis; the second segment SS2 is at the right side of the $m^{th}$ pixel column C(m) and is approximately parallel to the Y axis; and the third segment SS3 is between the pixel PX in the $m^{th}$ pixel column C(m) and the $(n+1)^{th}$ pixel row R(n+1) and the pixel PX in the $m^{th}$ pixel column C(m) and the $(n+2)^{th}$ pixel row R(n+2), and is approximately parallel to the X axis, where the X and Y axes are perpendicular. The touch sensing line SL(m+1) is curved or bent between two vertically adjacent pixels PX. Because the X axis is perpendicular to the Y axis, the curved angle or the bent angle of the touch sensing line SL(m+1) may be about 90 degrees. Likewise, the data line DL(m+1) which is adjacent to the touch sensing line SL(m+1) also has a first segment DS1, a second segment DS2 and a third segment DS3, in which the first segment DS1 is at the left side of the $m^{th}$ pixel column C(m) and is approximately parallel to the Y axis; the second segment DS2 is at the right side of the $m^{th}$ pixel column C(m) and is approximately parallel to the Y axis; and the third segment DS3 is the pixels PX in the $m^{th}$ pixel column C(m) and the $(n+1)^{th}$ pixel row R(n+1) and in the $m^{th}$ pixel column C(m) and the $(n+2)^{th}$ pixel row R(n+2), and is approximately parallel to the X axis. Further, as shown in FIG. 3B, the first segment DS1 of the data line DL(m+1) is coupled to the pixel transistors TFT of the subpixels RP, GP, BP of the pixel PX in the $m^{th}$ pixel column C(m) and the $(n+1)^{th}$ pixel row R(n+1). Although not being directly shown in FIG. 3B, the persons skilled in the art may be directly comprehend according to the contents illustrated in FIGS. 3A-3B that, the second segment DS2 of the data line DL(m+1) is coupled to the pixel transistor TFT of the subpixels RP, GP, BP of the pixel PX in the $(m+1)^{th}$ pixel column C(m+1) and the $(n+2)^{th}$ pixel row R(n+2).

It is noted that although FIG. 3B illustrates only a partial arrangement of the touch sensing line SL(m+1), the persons skilled in the art may directly comprehend according to the contents illustrated in FIG. 3B that, the touch sensing line SL(m+1) and the data line DL(m+1) are curved or bent between any two vertically adjacent pixels PX in the $m^{th}$ pixel column C(m). In addition, the other touch sensing lines and data lines in the active area 110A may also have similar arrangements.

Furthermore, although FIG. 3A illustrates only a part of the pixel columns and the pixel rows, it can still be directly derived from the contents shown in FIG. 3A that the number of columns of the pixel array in the active area 110A is M−1, i.e., the number M of the data lines DL(1)-DL(M) or the touch sensing lines SL(1)-SL(M) subtracted by 1. In addition, each pixel transistor is arranged at the left side of the corresponding subpixel, and therefore all the second to $M^{th}$ data lines DL(2)-DL(M) and all the second to $M^{th}$ touch sensing lines SL(2)-SL(M) have non-straight continuous curved shapes or non-straight continuous bent shapes, while the first data line DL(1) and the first touch sensing line SL(1) may be straight lines without non-straight continuous curved shapes or non-straight continuous bent shapes. In another embodiment, each pixel transistor is arranged at the right side of the corresponding subpixel, and correspondingly all the first to $(M−1)^{th}$ data lines DL(1)-DL(M−1) and all the first to $(M−1)^{th}$ touch sensing lines SL(1)-SL(M−1) have non-straight continuous curved shapes or non-straight continuous bent shapes, while the $M^{th}$ data line DL(M) and the $M^{th}$ touch sensing line SL(M) may be straight lines without non-straight continuous curved shapes or non-straight continuous bent shapes. In addition, in some embodiments, the data lines DL(1)-DL(M) and the touch sensing lines SL(1)-SL(M) may be formed from the same metal layer over the substrate 112.

Figure 4:
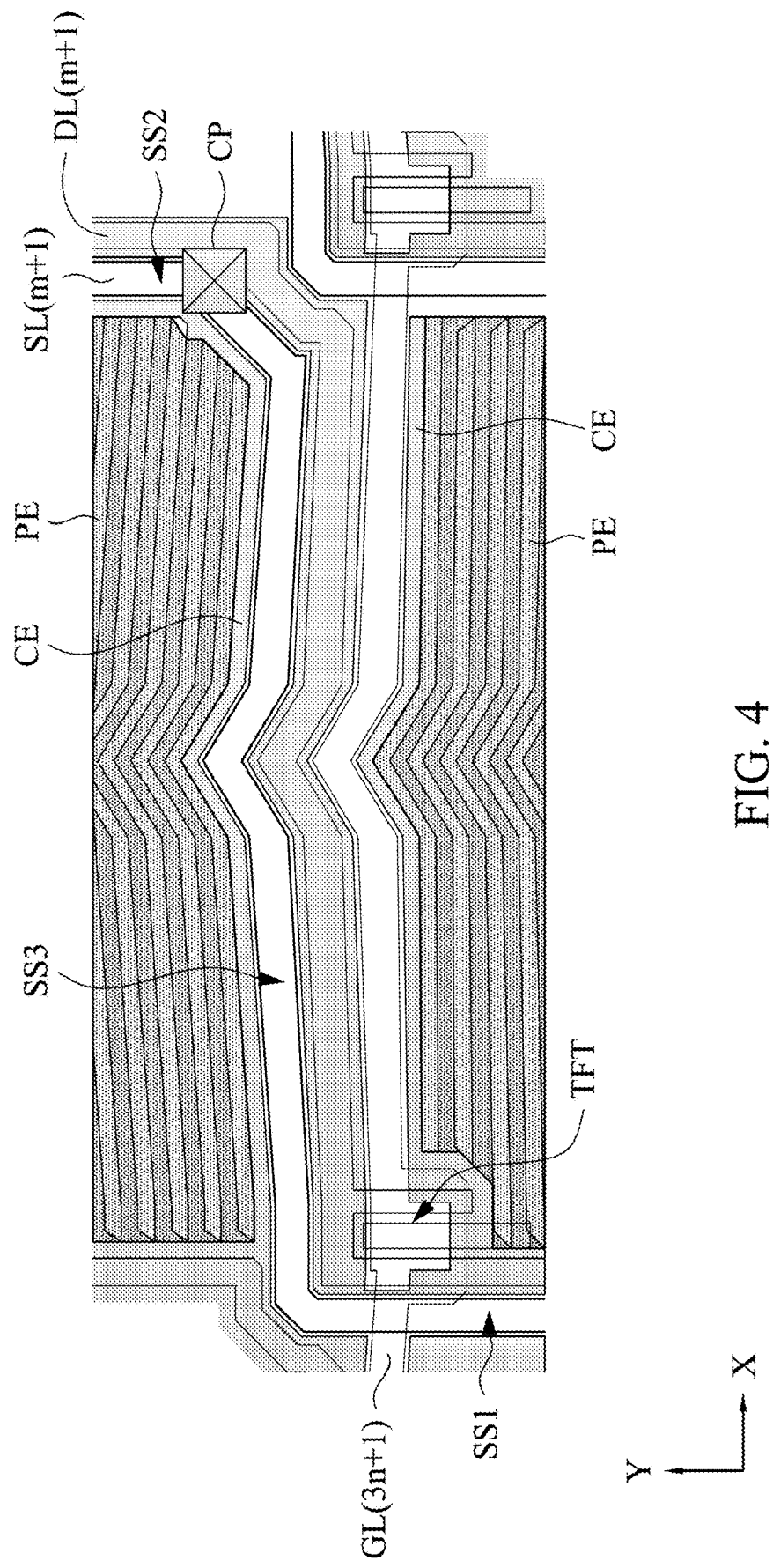
FIG. 4 is a schematic layout diagram of an area of the pixel structure shown in FIG. 3A.

FIG. 4 is a schematic layout diagram of an area A2 of the pixel structure shown in FIG. 3A, in which the dot-filled part and the gray part are the pixel electrode PE and the common electrode CE, respectively. The schematic layout diagram shown in FIG. 4 is a top-com pixel structure, in which the common electrode CE is over the pixel electrode PE. Although FIG. 4 illustrates a layout of only a part of two vertically adjacent subpixels and its neighboring data lines, scan lines and touch sensing lines, and the persons skilled in the art may directly derive from the contents shown in FIG. 4 that, the other part of the active area 110A may also have a similar layout.

As shown in FIG. 4, the common electrode CE has an opening directly over the touch sensing line SL(m+1). Except for the connection point CP, the touch sensing line SL(m+1) is not covered by the common electrode CE, so as to reduce the capacitance between the common electrode CE and the touch sensing line SL(m+1). As shown in FIG. 4, the first to third segments SS1-SS3 of the touch sensing line SL(m+1) are neither covered by the common electrode CE. In addition, most of the segments of the scan line GL(3n+1) are neither covered by the common electrode CE, so as to reduce the capacitance between the common electrode CE and the scan line GL(3n+1). The connection point CP may be arranged at a corner of the subpixel (for example, FIG. 4 shows that the connection point CP is at the lower right corner of the subpixel), so as to increase the aperture ratio of the subpixel. The connection point CP is connected to the touch sensing line SL(m+1) and the common electrode CE, such that the touch sensing line SL(m+1) is electrically connected to the common electrode CE. According to various embodiments, the connection point CP may include a direct via structure or a bridge structure.

Figure 5A:
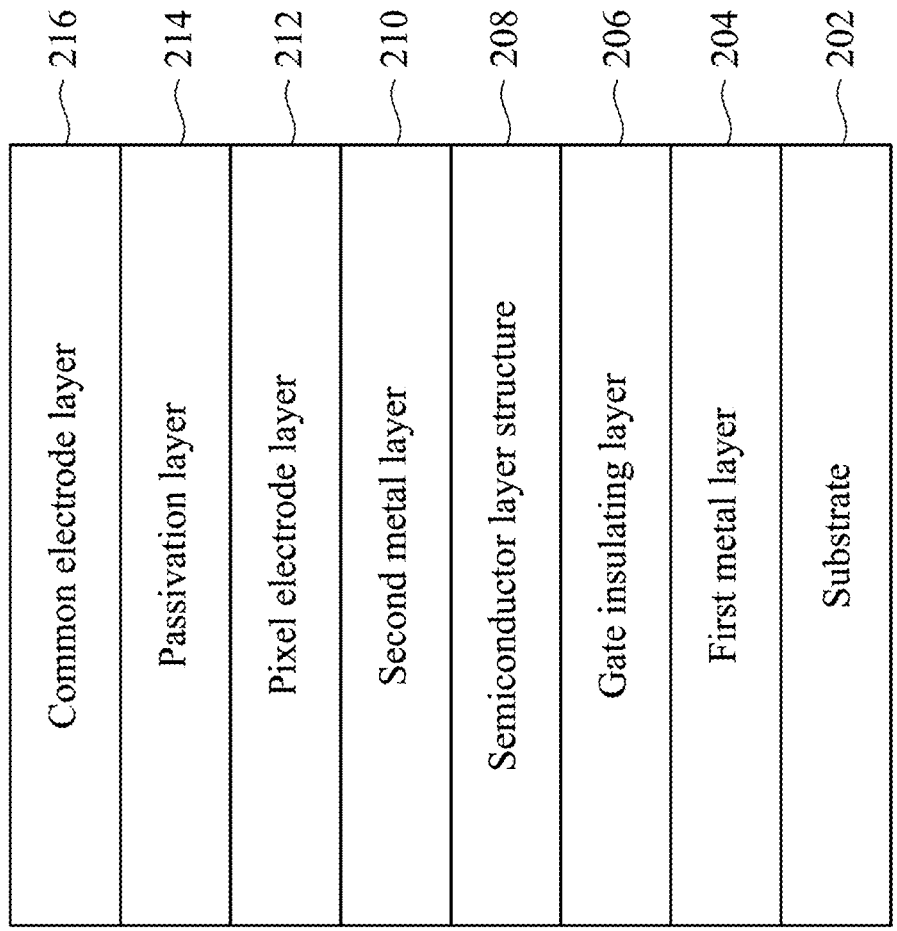
FIGS. 5A-5B are respectively a schematic structural diagram and a schematic cross-sectional diagram of the display panel shown in FIG. 1 in accordance with one example.
Figure 5B:
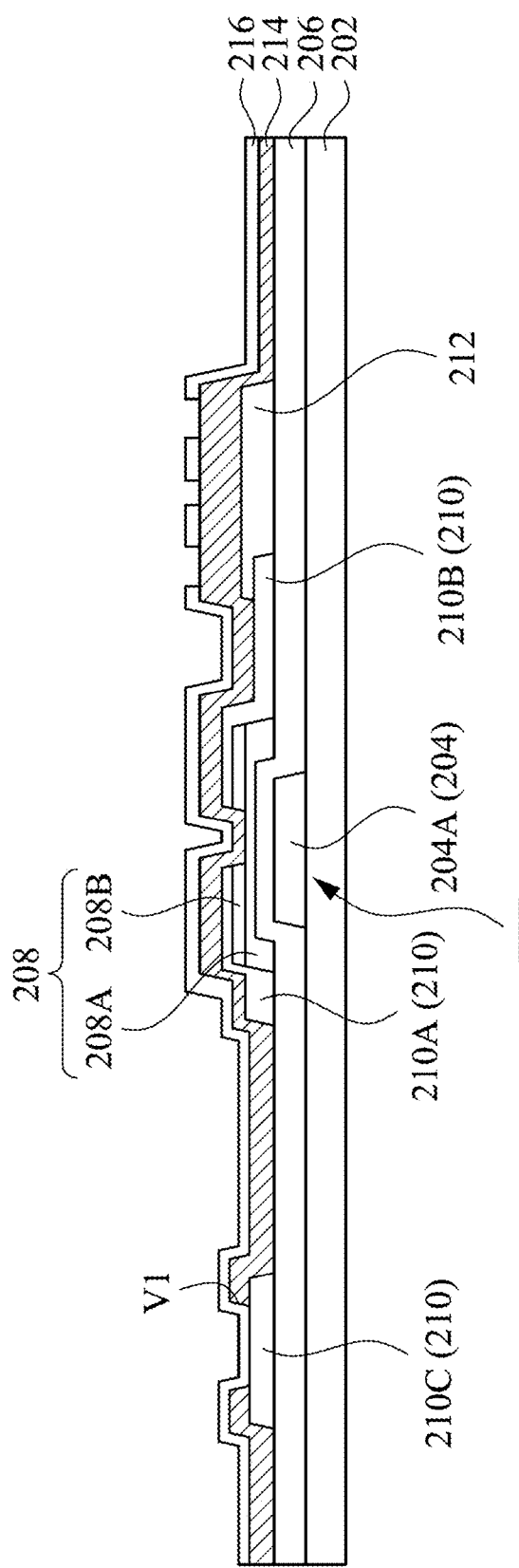

FIGS. 5A-5B are respectively a schematic structural diagram and a schematic cross-sectional diagram of the display panel 110 in FIG. 1 in accordance with one example. In this example, a first metal layer 204 is over a substrate 202, and may include a gate electrode 204A and a scan line (not shown in FIG. 5B). The substrate 202 corresponds to the substrate 112 in FIG. 1, and may be a glass substrate, a ceramic substrate or another substrate with suitable material. The gate insulating layer 206 is over the substrate 202 and the first metal layer 204, and covers the substrate 202 and the first metal layer 204. The semiconductor layer structure 208 is over the gate insulating layer 206, and includes a semiconductor layer 208A and a doped semiconductor layer 208B over the semiconductor layer 208A. The material of the semiconductor layer 208A may be amorphous silicon, monocrystalline silicon, polysilicon or another similar material, and the material of the doped semiconductor layer 208B may be doped amorphous silicon, doped monocrystalline silicon, doped polysilicon or another similar material. In addition, the semiconductor layer 208A and the doped semiconductor layer 208B may be sequentially formed by a chemical vapor deposition process or another similar deposition process.

The second metal layer 210 is over the gate insulating layer 206 and the semiconductor layer structure 208, and includes a source electrode 210A, a drain electrode 210B, data lines (not shown in FIG. 5B) and a touch sensing line 210C. The source electrode 210A, the drain electrode 210B, the gate electrode 204A, the semiconductor layer structure 208 and a portion of the gate insulating layer 206 cooperatively form the pixel transistor TFT. In some embodiments, a portion of the source electrode 210A belongs to a segment of the corresponding data line. The material of forming the first metal layer 204 and the second metal layer 210 may include chromium, tungsten, tantalum, titanium, molybdenum, aluminum, copper or another similar element, or a metal alloy or a compound formed of any combination of the above metal elements, but is not limited thereto.

A pixel electrode layer 212 is over the gate insulating layer 206 and the second metal layer 210, and directly contacts the drain electrode 210B. A passivation layer 214 is over the semiconductor layer structure 208, the second metal layer 210 and the pixel electrode layer 212, and covers the pixel transistor TFT and the pixel electrode layer 212, so as to provide protective and insulating functions for the pixel transistor TFT and the pixel electrode layer 212. A common electrode layer 216 is over the second metal layer 210 and the passivation layer 214, and may cover the passivation layer 214 and couple to the touch sensing line 210C via a through hole V1.

The material of forming the pixel electrode layer 212 and the common electrode layer 216 may be, but is not limited to, a transparent conductive material such as indium tin oxide (ITO) and indium zinc oxide (IZO), and the pixel electrode layer 212 and the common electrode layer 216 may be formed by a physical deposition process or another suitable deposition process. The material of the passivation layer 214 may be silicon oxide, silicon nitride, silicon oxynitride or another similar material, and the passivation layer 214 may be formed by a chemical vapor deposition process or another similar deposition process.

Figure 6A:
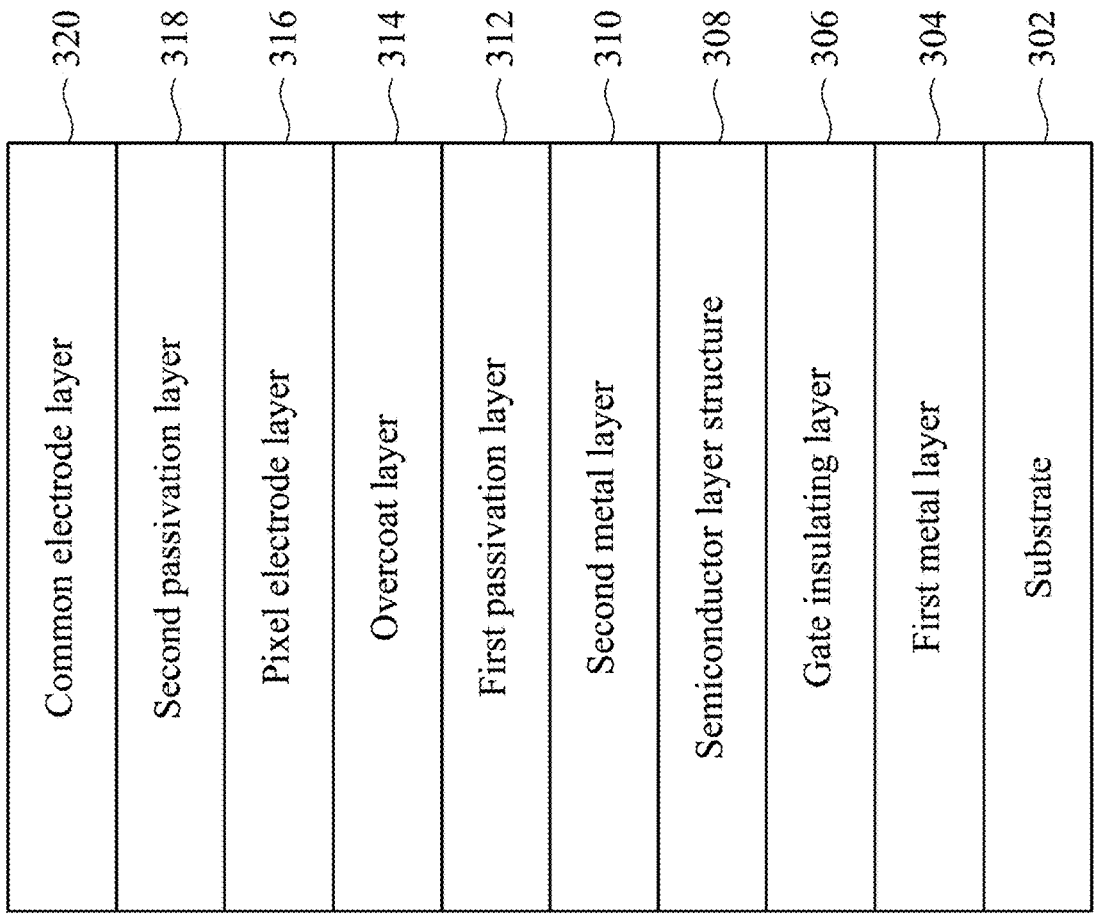
FIGS. 6A-6B are respectively a schematic structural diagram and a schematic cross-sectional diagram of the display panel shown in FIG. 1 in accordance with another example.
Figure 6B:
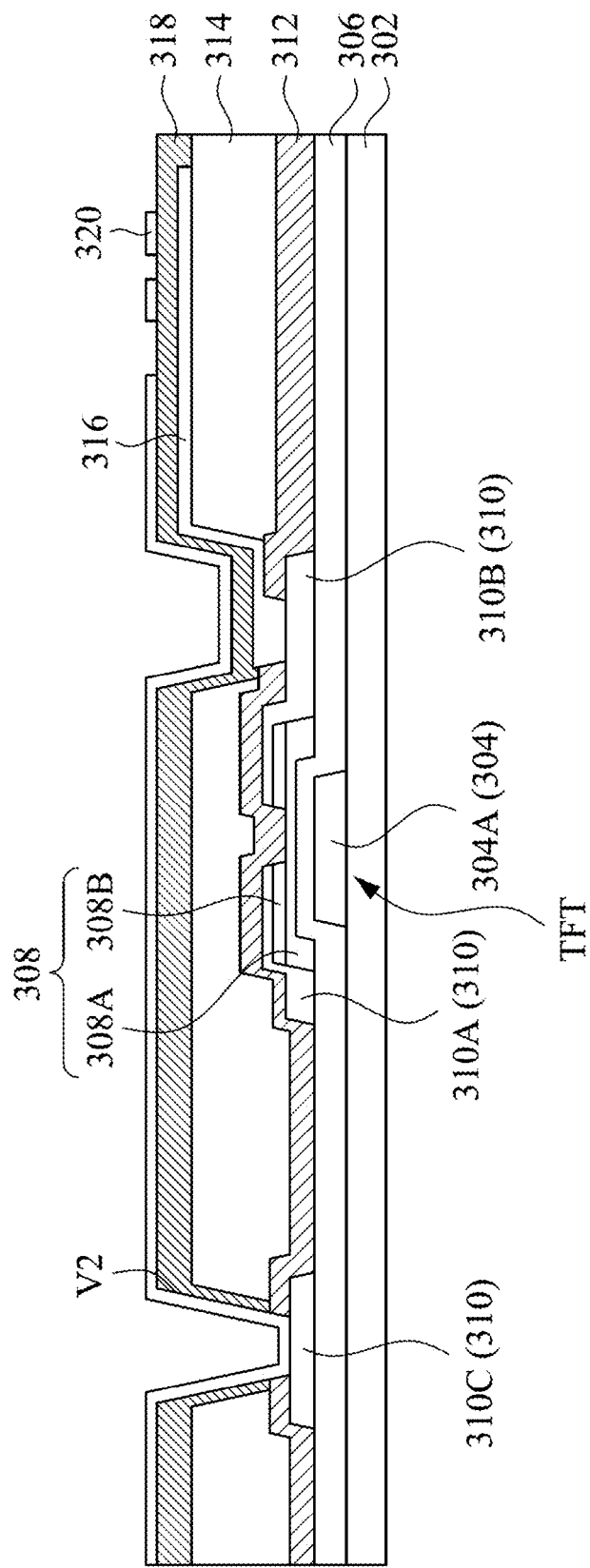

FIGS. 6A-6B are respectively a schematic structural diagram and a schematic cross-sectional diagram of the display panel 110 in FIG. 1 in accordance with another example. In this example, a first metal layer 304 is over a substrate 302 and may include a gate electrode 304A and a scan line (not shown in FIG. 6B). A gate insulating layer 306 is over the substrate 302 and the first metal layer 304, and covers the substrate 302 and the first metal layer 304. A semiconductor layer structure 308 is over the gate insulating layer 306, and includes a semiconductor layer 308A and a doped semiconductor layer 308B over the semiconductor layer 308A. A second metal layer 310 is over the gate insulating layer 306 and the semiconductor layer structure 308, and includes a source electrode 310A, a drain electrode 310B, a data line (not shown in FIG. 6B) and a touch sensing line 310C. The substrate 302, the first metal layer 304, the gate insulating layer 306, the semiconductor layer structure 308 and the second metal layer 310 may be respectively the same as or similar to the substrate 202, the first metal layer 204, the gate insulating layer 206, the semiconductor layer structure 208 and the second metal layer 210 in FIGS. 5A and 5B, and therefore the related descriptions thereof can be referred to those in connection with those in FIGS. 5A and 5B and are not narrated herein.

The first passivation layer 312 and the overcoat layer 314 are sequentially over the gate insulating layer 306, the semiconductor layer structure 308 and the second metal layer 310, and cover the pixel transistor TFT. The first passivation layer 312 may provide protective and insulating functions for the pixel transistor TFT, and the overcoat layer 314 may be used to adjust the electrical property of the display panel and reduce the load of the upper common electrodes onto the lower touch sensing lines and scan lines, thereby improving the touch sensing performance of the display panel. In another embodiment, the display panel may only have the first passivation layer 312 but without the overcoat layer 314. The pixel electrode layer 316 is over the second metal layer 310, the first passivation layer 312 and the overcoat layer 314, and directly contacts a drain electrode 310B. The second passivation layer 318 is over the first passivation layer 312, the overcoat layer 314 and the pixel electrode layer 316, and covers the pixel electrode layer 316, so as to provide protective and insulating functions for the pixel electrode layer 316. The common electrode layer 320 is over the second metal layer 310, the first passivation layer 312 and the second passivation layer 318, and is coupled to the touch sensing line 310C via a through hole V2.

The material of forming the first passivation layer 312 and the second passivation layer 318 may be silicon oxide, silicon nitride, silicon oxynitride or another similar material, and the first passivation layer 312 and the second passivation layer 318 may be formed by chemical vapor deposition processes or other similar deposition processes. The material of forming the overcoat layer 314 may be an organic dielectric material such as epoxy resin, acrylic resin, polyimide (PI) or another suitable material, or an inorganic dielectric material such as silicon oxide, silicon nitride or another suitable material. In addition, the material of forming the pixel electrode layer 316 and the common electrode layer 320 may be, but is not limited to, a transparent conductive material such as indium tin oxide or indium zinc oxide, and the pixel electrode layer 316 and the common electrode layer 320 may be formed by a physical vapor deposition process or another similar deposition process.

Figure 7A:
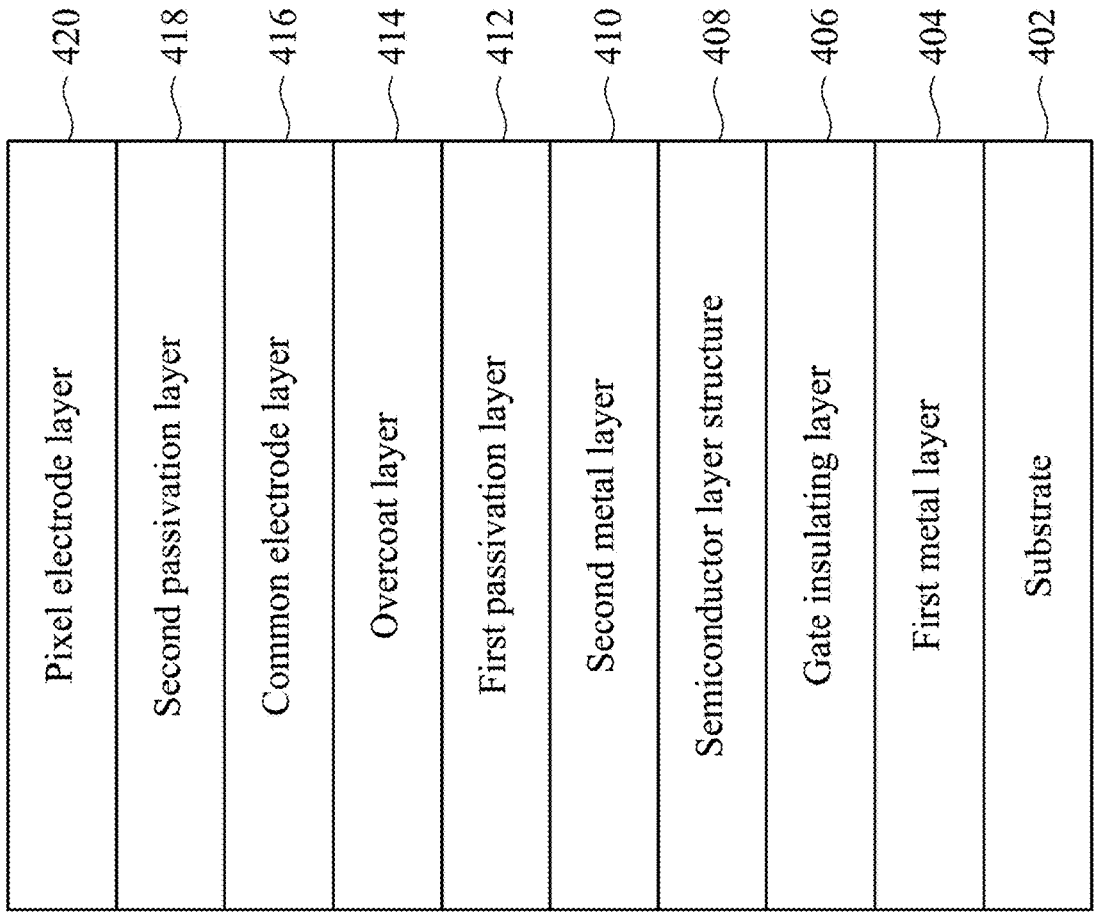
FIGS. 7A-7B are respectively a schematic structural diagram and a schematic cross-sectional diagram of the display panel shown in FIG. 1 in accordance with yet another example.
Figure 7B:
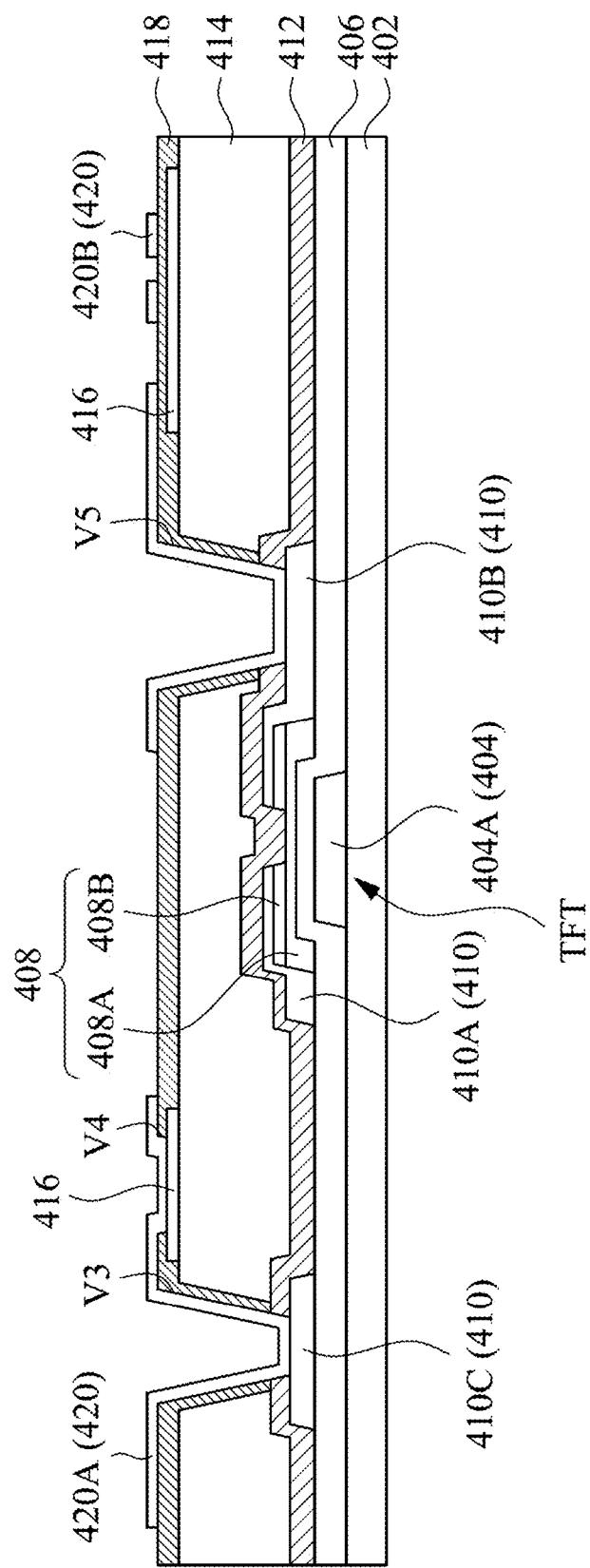

FIGS. 7A and 7B are respectively a schematic structural diagram and a schematic cross-sectional diagram of the display panel 110 in FIG. 1 in accordance with yet another example. In this example, the first metal layer 404 is over the substrate 402 and may include a gate electrode 404A and a scan line (not shown in FIG. 7B). A gate insulating layer 406 is over the substrate 402 and the first metal layer 404, and covers the substrate 402 and the first metal layer 404. A semiconductor layer structure 408 is over the gate insulating layer 406, and includes a semiconductor layer 408A and a doped semiconductor layer 408B on the semiconductor layer 408A. The second metal layer 410 is over the gate insulating layer 406 and the semiconductor layer structure 408, and includes a source electrode 410A, a drain electrode 410B, a data line (not shown in FIG. 7B) and a touch sensing line 410C. The substrate 402, the first metal layer 404, the gate insulating layer 406, the semiconductor layer structure 408 and the second metal layer 410 may be respectively the same as or similar to the substrate 202, the first metal layer 204, the gate insulating layer 206, the semiconductor layer structure 208 and the second metal layer 210 in FIGS. 5A and 5B, and therefore the related descriptions thereof can be referred to those in connection with those in FIGS. 5A and 5B and are not narrated herein.

The first passivation layer 412 and the overcoat layer 414 are sequentially over the gate insulating layer 406, the semiconductor layer structure 408 and the second metal layer 410, and cover the pixel transistor TFT. The first passivation layer 412 may provide protective and insulating functions for the pixel transistor TFT, and the overcoat layer 414 may be used to adjust the electrical property of the display panel. The first passivation layer 412 and the overcoat layer 414 may be respectively the same as or similar to the first passivation layer 312 and the overcoat layer 314 in FIGS. 6A and 6B, and therefore the related descriptions thereof can be referred to those in connection with those in FIGS. 6A and 6B and are not narrated herein.

The common electrode layer 416 is over the overcoat layer 414, and the second passivation layer 418 is over the first passivation layer 412, the overcoat layer 414 and the common electrode layer 416. The pixel electrode layer 420 is over the second metal layer 410, the first passivation layer 412, the common electrode layer 416 and the second passivation layer 418, and includes a bridge structure 420A and a pixel electrode 420B, in which the bridge structure 420A is coupled to the touch sensing line 410C and the common electrode layer 416 respectively via through holes V3, V4, such that the touch sensing line 410C is electrically connected to the common electrode layer 416, while the pixel electrode 420B is coupled to the drain electrode 410B via a through hole V5.

In comparison with the top-com pixel structures shown in FIGS. 5A-6B, the pixel structure shown in FIGS. 7A and 7B is a top-pixel pixel structure. In other words, in the pixel structure shown in FIGS. 7A and 7B, the pixel electrode layer 420 is over the common electrode layer 416. In addition, the material and process of forming the common electrode layer 416, the second passivation layer 418 and the pixel electrode layer 420 may be respectively similar to those of forming the common electrode layer 320, the second passivation layer 318 and the pixel electrode layer 316 in FIGS. 6A and 6B.

In summary, the invention can enable the layout size of the pixels to be consistent, such that the gate-source capacitances (Cgs) of the pixel transistors are approximately the same, so as to avoid poor display quality and vertical line (V-line) defects, as well as achieving low power consumption.

Although the invention has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A display panel comprising:
   a plurality of pixels arranged in a plurality of pixel rows and a plurality of pixel columns, each of the pixels having a plurality of subpixels;
   a plurality of data lines configured to transmit a plurality of data signals to the pixels, each of the data lines having a non-straight and continuously curved shape or a non-straight and continuously bent shape; and
   a plurality of scan lines configured to sequentially transmit a plurality of scan signals to the pixels;
   wherein the subpixels of each of the pixels are coupled to different scan lines, and each of the data lines is curved or bent with respect to a unit of one pixel.

2. The display panel of claim 1, wherein the second to the penultimate of the data lines respectively have a plurality of first segments and a plurality of second segments, and the first segments and the second segments of the same data line are respectively coupled to two adjacent pixel columns.

3. The display panel of claim 1 further comprising:
   a plurality of touch sensing lines configured to provide a plurality of touch sensing signals, each of the touch sensing lines having a non-straight and continuously curved shape or a non-straight and continuously bent shape, and each of the touch sensing lines is curved or bent with respect to a unit of one pixel.

4. The display panel of claim 3, wherein the data lines and the touch sensing lines are formed from the same metal layer.

5. The display panel of claim 4, wherein a distance between two adjacent data line and touch sensing line in the data lines and the touch sensing lines is 3 microns to 5 microns.

6. The display panel of claim 3 further comprising:
a pixel electrode layer having a plurality of pixel electrodes that are respectively in the subpixels of the pixels; and
a common electrode layer having a plurality of common electrodes that are respectively coupled to the touch sensing lines.

7. The display panel of claim 6, wherein each of the common electrodes has an opening directly over at least one of the touch sensing lines.

8. The display panel of claim 6, wherein the common electrode layer is over the pixel electrode layer, and each of the common electrodes is coupled to at least one of the touch sensing lines via at least one first through hole.

9. The display panel of claim 6, wherein the pixel electrode layer is over the common electrode layer and further comprises a plurality of bridge electrodes, and each of the common electrodes is coupled to at least one of the touch sensing lines via at least one of the bridge electrodes.

10. The display panel of claim 9, wherein each of the pixel electrodes is coupled to a pixel transistor of one of the subpixels via a second through hole.

11. The display panel of claim 6, wherein each of the common electrodes has an opening directly over at least one of the scan lines.

12. A method of fabricating a display panel, the method comprising:
forming a first metal layer over a substrate, the first metal layer comprising a plurality of scan lines; and
forming a second metal layer over the first metal layer, the second metal layer comprising a plurality of data lines and a plurality of touch sensing lines, the data lines and the touch sensing lines having a non-straight and continuously curved shape or a non-straight and continuously bent shape;
wherein the scan lines and the data lines cooperatively define a plurality of subpixels, the subpixels are respectively coupled to the scan lines, and the data lines and the touch sensing lines are curved or bent with respect to a unit of three subpixels.

13. The method of claim 12 further comprising:
forming a pixel electrode layer over the second metal layer, the pixel electrode layer comprising a plurality of pixel electrodes that are respectively in the subpixels; and
forming a common electrode layer over the pixel electrode layer, the common electrode layer comprising a plurality of common electrodes that are respectively coupled to the touch sensing lines.

14. The method of claim 13 further comprising:
patterning the common electrode layer to form an opening of the common electrodes directly over the touch sensing lines.

15. The method of claim 12 further comprising:
forming a common electrode layer over the second metal layer, the common electrode layer comprising a plurality of common electrodes that are respectively coupled to the touch sensing lines; and
forming a pixel electrode layer over the common electrode layer, the pixel electrode layer comprising a plurality of pixel electrodes that are respectively in the subpixels.

16. The method of claim 15 further comprising:
patterning the common electrode layer to form an opening of the common electrodes directly over the touch sensing lines.

* * * * *